April 6, 1926.  
B. P. KOOLS  
VEGETABLE PEELER  
Filed Nov. 4, 1921  
1,579,771  
4 Sheets-Sheet 1

Witness:  
a.a.Brand

Inventor  
Bernard P. Kools  
by Jones, Addington, Ames & Seibold  
Attys

Patented Apr. 6, 1926.

1,579,771

UNITED STATES PATENT OFFICE.

BERNARD P. KOOLS, OF APPLETON, WISCONSIN, ASSIGNOR TO THE KOOLS MANUFACTURING COMPANY, OF APPLETON, WISCONSIN, A CORPORATION OF WISCONSIN.

VEGETABLE PEELER.

Application filed November 4, 1921. Serial No. 512,752.

*To all whom it may concern:*

Be it known that I, BERNARD P. KOOLS, a subject of the Queen of Holland, residing at Appleton, in the county of Outagamie and State of Wisconsin, have invented new and useful Improvements in Vegetable Peelers, of which the following is a full, clear, concise, and exact description, reference being had to the accompanying drawing, forming a part of this specification.

My invention relates to a vegetable paring machine, and it has especial relation to an apparatus of the character designated, wherein means are provided for causing a paring device to accurately follow the irregularities of the surface of a vegetable and particularly to follow the rounded ends thereof. Those vegetable paring machines which have heretofore been proposed do not, in so far as I am aware, make adequate provision for paring the rounded ends of the vegetables whereby a vegetable which has irregular straight sides and comparatively sharply rounded ends can be divested of its skin without undue gouging and consequent loss of the body thereof.

One object of my invention, therefore, is to provide means for accomplishing this last named result. In pursuance of this object I provide means whereby a paring tool is moved relatively to a vegetable to peel therefrom the skin in such manner that the surface will be entirely peeled, irrespective of the irregularities in the surface thereof, and more particularly irrespective of the sharply rounded ends which such a vegetable may have.

Another object of my invention is to provide a novel paring tool which is floatable and has a plurality of motions in different directions whereby the above advantage of paring without waste, may be accomplished. In this connection I provide a paring device which comprises, in so far as I am aware, a novel cutting edge. Moreover, I incorporate an adjusting means with the cutting edge whereby a thin or thick paring may be made, as desired.

In machines with which I am familiar and which have heretofore been proposed, it is a matter of considerable difficulty to properly pare those portions which are engaged by a holding means during the time the vegetable is being pared. A further object of my invention, therefore, is to provide means which cut off the engaged ends of the vegetable upon the completion of the paring operation. Such cutting means are automatically operated after the body of the vegetable has been peeled whereby said vegetable drops from the machine in a completely peeled state.

I also contemplate the provision of means whereby the above cutting tool accurately pares the rounded ends of the vegetable irrespective of the length thereof, and moreover, whereby the end cutting means are positively governed in accordance with the length of the vegetable.

Finally I find it desirable to provide a continuously operating driving means for turning the vegetable in relation to the cutting tool, as well as for progressing the cutting tool along the surface of the vegetable. I therefore incorporate means in my machine whereby, upon the completion of the peeling operation, the vegetable turning means and the cutter progressing means are automatically disengaged from the continuously operating driving means. In this connection I also provide means for again connecting the paring devices to the driving means when it is desired to initiate the paring of a vegetable.

Various other objects and advantages of my machine will be evident upon a consideration of the hereinafter description, read with the accompanying drawing, in which.

Referring more particularly to the drawings, my invention embodies a frame having a bed 21 from which rises ends 22 and 23, rods 25 and 26 extending between the ends 22 and 23 and serving, as will hereinafter be described, to slidably support various operating mechanisms.

Another rod 27 is pivotally mounted in and extends between standards 28 and 29 which are positioned on the end frames 22 and 23 respectively. It will be observed that this last mentioned rod 27 has a keyway 30 extending longitudinally therealong, for purposes to be hereinafter described.

A work holding and turning arbor comprises vegetable engaging parts; one part 31, which is provided with a re-entrant engaging portion 32, is journalled in a fixed collar 33 in the end frame 23. A gear wheel 34 is fixed to the outer end of the arbor portion 31, and serves to rotate the same. A pin 35 extends through the center of the member 31 and is urged to the left by a spring 36, the latter being mounted in a pocket at the end of the member 31.

Another portion 37 of the work arbor is provided with a vegetable gripping means 38 which cooperates with the gripping means 32 to grip and rigidly hold a vegetable placed therebetween. The member 37 is slidably journalled in the end frame 22 and has fixed thereto a gear wheel 39 whereby it may be turned in unison with the member 31. It will be observed that the wheel 39 is keyed to the member 37 at 40 whereby said member may slide through said gear wheel and into a protecting cover 41 which is mounted upon a bracket 42 fixed to the end frame 22. A pin 43 extends through the center of the member 37 and is adapted to protrude from the right hand end thereof when said member 37 slides to its extreme left hand portion.

Portion 37 of the work arbor is moved into and out of engagement with the end of the vegetable by a sliding member 44 which is loosely secured to said member 37 by collars 45 and 46. The slidable member, just referred to, is supported by the rods 27 and 26 and comprises a handle portion 47 which extends across the top of the machine and which may be gripped to slide the entire member along the rods 26 and 27. A bracket portion 48 of this slidable member has depending therefrom collar portions 49 and 50, which serve to slidably secure, on the rod 27, the collar 51, said collar 51 being provided with a key which engages the keyway 30 of the rod whereby, upon a rotation of the collar 51, the rod 27 is rotated in its journals.

The collar 51 has depending therefrom a rock arm 52 to which is pivotally attached an arm 53, the latter being in turn attached to a rock arm 54 which is pivotally mounted in a standard 55, integral with the sliding member 44. The rock arm 54 is rigidly mounted on a shaft 56 which extends through the standard or journal 55 and has secured to its lower end an engageable arm 57, it being understood that, when the arm 57 is swung to the left, the arm 53 (see Fig. 1) moves in such direction that the collar 51 rotates and consequently causes the rotation of the rod 27 in the latter's journals.

Figure 1:
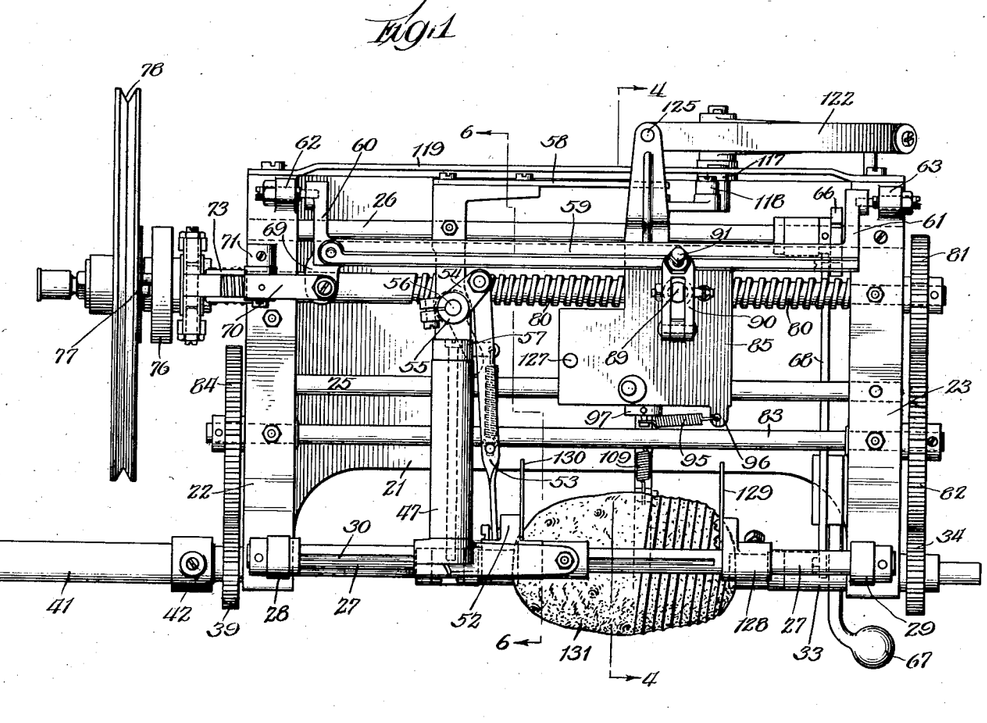
Figure 1 is a plan view of a vegetable paring machine embodying my invention.
Figure 3:
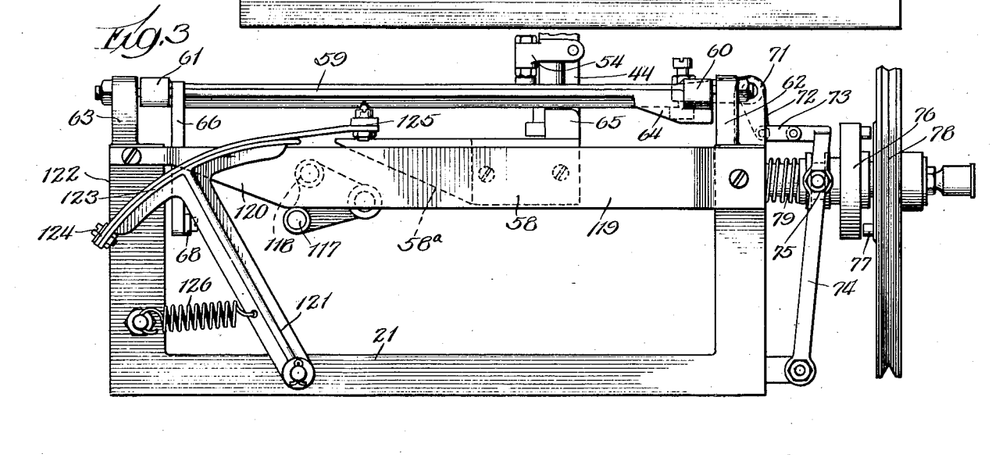
Fig. 3 is an elevational side view taken from the left hand side of Fig. 1.

A guide member 58, having a cam surface 58$^a$, is secured to the sliding member 44, as best shown in Figs. 1 and 3, and of course travels therewith as said member 44 is pushed along its supporting rods. A bar 59 is mounted through arms 60 and 61 to rotate above pivotal mounting standards 62 and 63. On the under side of this bar is a cam portion 64 and it will be observed (see Fig. 3) that this bar normally rests on a shoulder 65 on the member 44, but that, when said member 44 has been moved to the extreme right (Fig. 3) the bar will be lifted by the engagement of the shoulder 65 with the sloping cam surface 64. Upon the lifting of said bar (see Fig. 4) a pivoted arm 66 moves to the right and under said bar, whereby the latter is maintained in its upper position until the arm 66 is moved from thereunder by the trip member 67 which operates through an arm 68 to move the upper end of the arm 66 to the left and allow the bar 59 to descend because of its own weight. A weight presses the arm 66 constantly to the right whereby it always moves under said bar 59 when the latter is lifted.

The bar 59 is also provided (see Fig. 1) with a lug 69 upon which one arm 70 of a bell crank is pivoted in a lug 71, and the other arm 72 is connected by a link 73 (see Fig. 3) to a pivoted arm 74, which is in turn loosely mounted on a collar 75 attached to member 76 of a clutch. The member 76 is urged into engagement with cooperating pins 77 on a pulley 78 by a spring 79. The member 76 is fixed to, and serves to rotate a worm shaft 80 which is journalled in the two end frames.

At the right hand side of the machine (as viewed in Fig. 1), a gear wheel 81 is fast to the shaft of the worm 80 and intermeshes with a gear 82, which in turn intermeshes with the gear 34. The gear 82 is fast to the shaft 83, which is journalled between the end frames and which has a gear 84 fixed to its left hand end, the latter meshing with the gear 39. It will be observed, therefore that, when the pulley 78 is connected to the worm shaft 80, the system of gears is such that the two parts, 31 and 37 of the work arbor, are rotated in the same sense, and moreover, of course, the worm 80 is rotated.

A carriage 85 is slidably mounted on the rods 25 and 26, and has rising from the upper surface thereof a hollow standard and support 86. A yoke 87 is pivoted to the support 86 and has a pawl or pin 88 secured thereto by a pin 89 extending between the arms of the yoke 87. A free end 90 of the yoke rests upon the bar 59 and its position with respect thereto may be varied by an adjusting screw 91. The pawl 88 engages, at its lower end, the thread of the worm whereby, when the parts are in the position shown in Fig. 4, the carriage 85 is moved along its supporting rods 25 and 26 by the rotation of the worm. Depending from the carriage 85 are two lugs 92 and 93 and journalled in and between these lugs, is a rock shaft 94, which is constantly urged in a definite direction by a spring 95 which is attached to a lug 96 on the carriage and to a collar 97 which is fixed to the shaft 94.

A yoke 98 has a transverse member 99 extending between the arms thereof, it being understood (see Fig. 5) that the arms are journalled on said member 99, and therefore that said yoke 98 is capable of rocking about the pivotal points 100 and 101. The yoke 98 may also be rocked about an axis perpendicular to the plane of the paper, since it will be remembered that the shaft 94, to which the member 99 is secured, is journalled in the lugs 92 and 93. The motion of the yoke 98 about the pivotal points 100 and 101 (see Fig. 4) is restrained by a spring 102 which is attached at one end to a lug 103, fixed to the member 99, and at its other end to an arm 104, which extends from and is integral with the yoke 98. An adjusting screw 105 abuts against the rotatable collar 97 and prevents the spring 102 from pulling the arm 104 upwardly, as shown. By adjusting the screw 105, the arm 104 may be definitely positioned a predetermined minimum distance from said axis or shaft 93.

Arm 104 has formed at its outer end a bifurcated member 106 between the arms of which is swung a knife supporting member or arm 107. This last arm 107 is attached to a lug 108, which is mounted on the arm 104, by a spring 109 whereby the outer end of said arm 107 may swing upwardly and downwardly against the action of the spring 109.

Figures 4, 7:
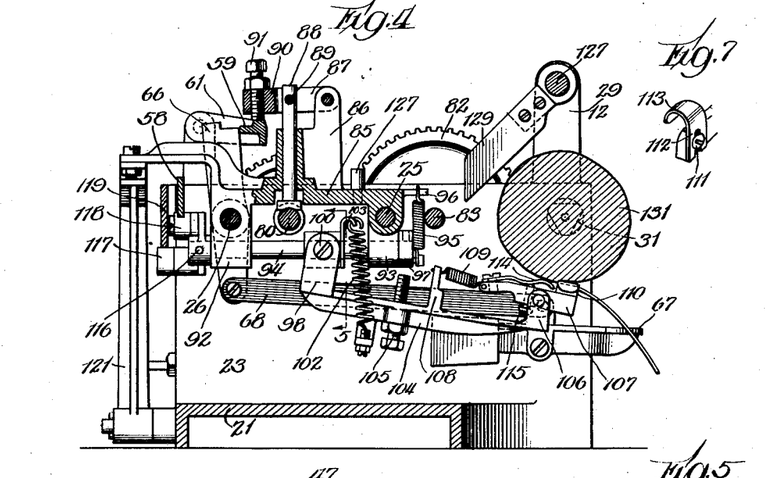
Fig. 4 is an elevational sectional view taken on the line IV—IV of Fig. 1.
Fig. 7 is a detail view of the knife embodied in my machine.

A knife 110 is adjustably mounted on the outer end of the arm 107 (see Fig. 7) by a screw 111 whereby said knife may be vertically adjusted with respect to the arm 107. The knife, as best shown in Fig. 7, comprises a shank portion 112 and an arcuate portion 113, the latter being sharpened to pare the vegetable. A guard member 114 is also mounted on the arm 107 and, when the machine is operating on a vegetable, has its upper face in contact with said vegetable. The position of this guard member may be adjusted by a screw 115.

Referring now to Figs. 1, 3 and 4, the shaft 94 has fixed thereto a member 116, which embodies rollers 117 and 118, whereby said shaft 94 may be positively swung about its journals when said rollers contact with, and roll along, properly positioned guide members. A member 119, having a cam surface 120, is fixed to the machine, and extends between the ends thereof, as shown.

A rock arm 121 is pivoted to the bed of the machine and is attached to the carriage 85 by a belt 122 which wraps around an arcuate member 123 formed integrally with said arm 121, the belt 122 being attached to said member 123 at 124, and being attached to the carriage 85 at 125. The arm 121 is constantly biased to the left (see Fig. 3) by a spring 126.

A pin 127 is mounted on the upper face of the carriage 85 to contact with, and move the arm 57 when the carriage 85 approaches the sliding member 44.

Rigidly mounted on the shaft 27 is a collar 128, to which is secured a knife 129. Another knife 130 is secured to the lug 52 and said two knives are therefore adapted to be swung in unison across the axis of the work abor when said shaft 27 is rotated.

Figure 2:
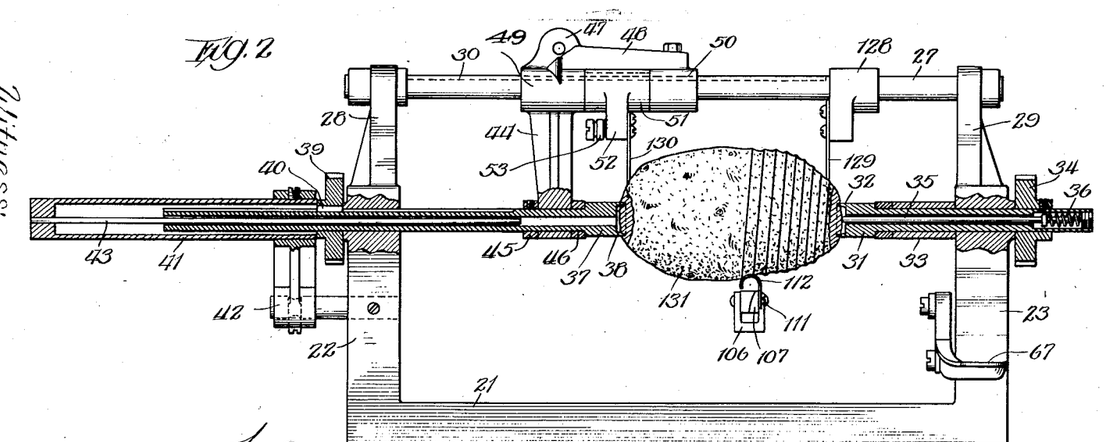
Fig. 2 is a side elevational view, partially in section, of the right hand side of the machine shown in Fig. 1.

Having now described the machine embodying my invention the operation thereof is as follows:

It will be assumed that the sliding member 44 has been moved to its extreme left hand position, (see Figs. 1 and 2) and that therefore the bar 59 has been lifted by the engagement of the shoulder 65 with the inclined portion 64. The lifting of said bar, as described, disengages the continuously operating pulley 78 from the worm shaft 80, whereby all of the gear system is stationary. Moreover, the bar 59, when lifted, pulls the arm 87 upwardly and disengages the pin 88 from the thread of the worm which allows the spring 126 to pull the carriage 85 to its extreme right hand position.

Figures 5, 6:
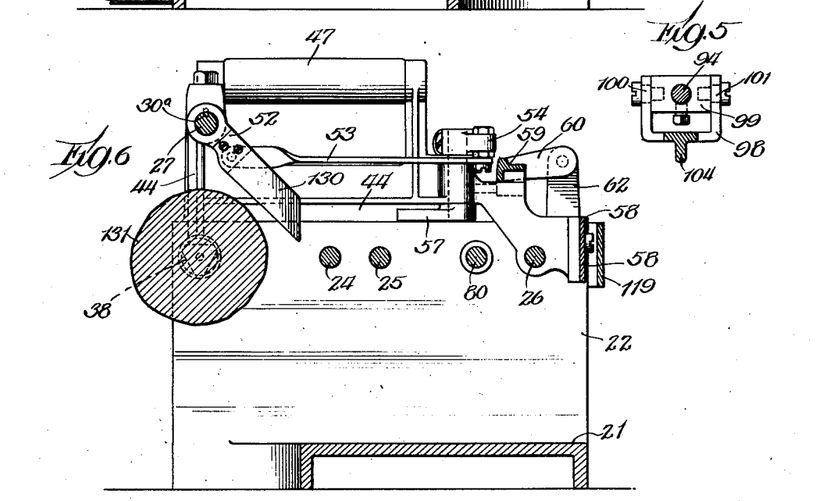
Fig. 5 is a fragmentary sectional view taken on the line V—V of Fig. 4.
Fig. 6 is an elevational sectional view taken on the line VI—VI of Fig. 1.

A vegetable 131, shown for purposes of illustration as a potato, is now placed between the two portions 31 and 37 of the work arbor and is held rigidly thereby, it being noted from Figs. 4 and 6 that the engaging portions of this arbor have a sharp triangular edge 132 whereby said vegetable may be gripped and rotated. The arm 68 is now tripped by pressing downwardly on the pedal 67 whereupon the bar 59 is released through the movement of the arm 66 to the left. The dropping of said bar 59 positively clutches the worm shaft 80 to the pulley 78 and, moreover, allows the pin 88 to drop into the threads of said worm shaft whereupon all of the gear wheels begin to rotate and the carriage 85 is moved to the left.

The rotation of the gears causes the work arbor to rotate and hereby moves the surface of the potato in relation to the knife 110, causing the latter to pare the skin from said vegetable. Because of the combined rotation of the vegetable and the longitudinal movement of the knife therealong, a spiral peeling is pared from the potato from end to end thereof. The hereinafter described swinging movement of the arm 107, about its pivotal mounting in the bifurcated member 106, allows the knife 110 to accurately follow the irregularities in the surface of the potato whereby the eyes thereof are as neatly peeled as is the rest of the surface.

Figure 8:
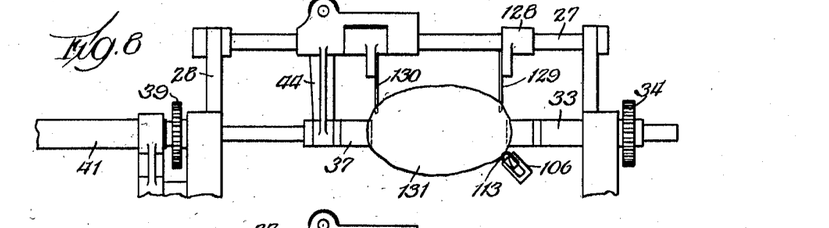
Figs. 8 to 12 inclusive are diagrammatic fragmentary and side elevational views taken from the right hand side of the machine shown in Fig. 1 and illustrate the manner in which the paring and cutting instruments operate during the peeling operation on a vegetable.

It will be noted that the potato, which as illustrated, has comparatively "fat" rounded ends, and if no provision were made whereby the cutting edge could be swung in an arc to follow the contour at the ends of the potato, the operation of the machine would be at once stopped, since the knife when traveling in a substantially straight line along the surface of the vegetable would merely gouge the end thereof and not accurately pare the same. As hereinbefore described, however, I have provided means for positively guiding the paring knife to accurately follow the ends of the potato. The shaft 94, upon which said knife is mounted, through the instrumentality of the hereinbefore described arms, is positively swung in its journals as the paring operation is initiated, by the engagement of the roller 117 with the inclined edge 120. This positive swinging of the shaft 94 causes the knife to travel in the position shown in Fig. 8 and, as the knife progresses along the surface of the potato, the shaft 94 rotates said knife until the straight surface of the vegetable is reached. At this time the roller 117 rolls along the straight lower edge of the member 119 whereupon the shaft 94 ceases its rotation and the knife is progressed in a straight line.

Figure 9:
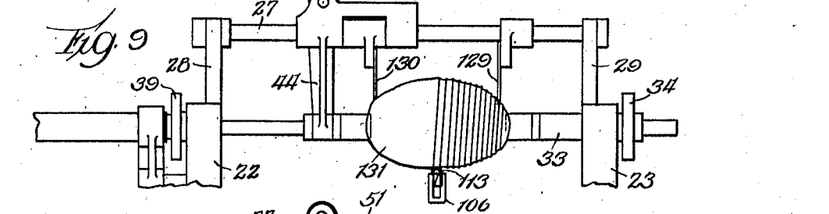

During this portion of the paring operation, those irregularities of the surface which cannot be accommodated by the swinging of the arm 107 are provided for because the entire arm 104 may also move in a vertical direction. The surface of the potato bears against the guard 114 and moves said arm 104 downwardly against the action of the spring 102, it, of course, being understood that, as the cross section of the vegetable decreases, said spring 102 moves the arm upwardly again and brings the guard and knife against the vegetable surface. In this connection it should be noted that the guard and knife so cooperate that, when the eye portion of the potato approaches the paring edge, it is gouged out by the swinging of the arm 107 about its pivotal supports. This part of the paring operation, that is, when the knife is passing along a straight part of the potato, is illustrated in Fig. 9.

Figure 10:
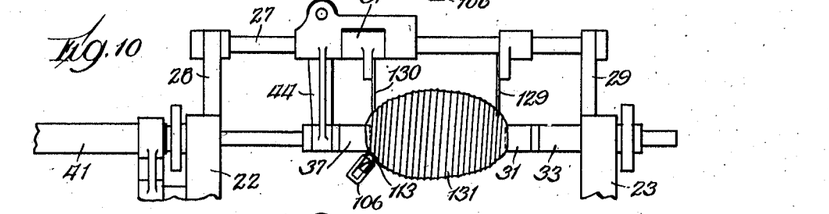

When the knife approaches the other rounded end of the potato, the shaft 94 is again positively rotated to cause said knife to bodily travel in the proper arc. This last mentioned rotation of the shaft 94 occurs when the roller 118 strikes and rolls downwardly along the inclined surface 58ª, the latter being the edge of the member 58 which is attached to the slidable member 44. This portion of the operation is illustrated in Fig. 10. As I have hereinbefore indicated the last described operation ensues irrespective of the length of the potato, because the cam surface 58ª moves with the member 44 and the latter, in turn, has its position governed by the length of the potato, since it is engaged thereby. It follows, therefore that, even though the length of the vegetable being pared is such that the member 44 is far to the right (see Fig. 3), the roller 117 will maintain the straight progression of the knife 110 until the roller 118 comes into contact and slides along the edge 58ª, thereby causing the knife to turn only when the end of the potato is reached.

Figures 11, 12:
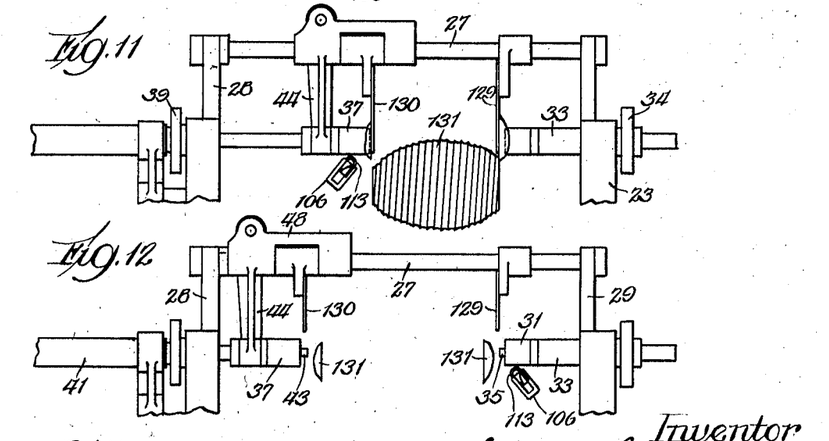

After the carriage 85 has progressed the knife the entire length of the potato, the pin 127 which is mounted thereupon contacts with, and moves the arm 57, which in turn moves the arm 53 and swings the knives 129 and 130 downwardly across the engaged ends of the potato and close to the point at which they are engaged by the gripping members 32 and 38. The arbor, however, continues to turn and this turning, together with the position of the knives 129 and 130, causes the body of the potato to be severed from the engaged ends thereof. Thereupon, as shown in Fig. 11, the potato drops from the machine. In this connection attention is directed to the completely pared state of the potato, a feature which, in so far as I am aware, has not been heretofore provided for. The advantages which are incident to such operation are obvious, since the entire surface of the potato has been peeled and it is not necessary for those portions which have been engaged to be manually removed therefrom.

The handle 47 is now grasped and the sliding member 44 moved to its extreme left hand position whereupon the pins 35 and 43 protrude from the ends of the arbor portions 31 and 37 and expel the cut off ends of the potato from engagement with the gripping member, (as shown in Fig. 12). The movement of said member 44 to the left raises the bar 59 and disengages the movable portions of the machine from the continuously operating driving means. At the same time the raising of the bar 59 disengages the carriage 85 from the worm 80, whereupon said carriage is returned to its initial position by the spring 126. The machine is now ready to have another vegetable inserted between the work arbor portions, and the above described operation again proceeded with.

To those skilled in the art the advantages which I obtain from the above described machine and the method of its operation will be apparent. Particular attention is directed to the form of knife which I employ and which, because of its adjustable mounting, may serve to peel a very thin paring or a very thick one. Moreover, it will be observed that said knife is capable of at least three distinct movements. One movement provides for the paring of the minor irregularities in the surface, and the bodily mounting of the arm 104 provides for paring of the more pronounced irregularities of surface. Finally the rounded ends of the potato are accurately peeled by positively causing the knife to travel in an arc at these points. And in this connection, the means whereby this last mentioned operation is performed, irrespective of the length of the vegetable, should be especially noted.

Moreover, the provision of positively operated knives which cut the body of the potato loose from the engaged ends thereof is of marked advantage, and here again it will be observed that these knives are automatically operated upon the completion of the paring operation, irrespective of the length of the vegetable operated upon.

While I have described but one embodiment of my invention it is obvious that many modifications thereof may occur to those skilled in the art, and I desire therefore, that my invention be limited only by the showing of the prior art and by the scope of the appended claims.

What I claim as new and desire to secure by Letters Patent of the United States is:

1. In a vegetable paring machine, a vegetable paring means, and means for causing said paring means to follow closely the surface of said vegetable and to be maintained substantially normal to the surface of said vegetable irrespective of the irregularities therein or of the length thereof.

2. In a vegetable paring machine, means for holding a vegetable by engagement of the ends thereof, paring means for removing the skin from every part of said vegetable except those portions which are engaged by said holding means, the paring means being maintained normal to the entire surface of the vegetable irrespective of the length of the latter, and means for cutting off said engaged portions whereby a completely pared vegetable is obtained.

3. In a vegetable paring machine, means for holding a vegetable by engagement of the ends thereof, paring means for removing the skin from every part of said vegetable except those portions which are engaged by said holding means, said paring means being maintained normal to the vegetable surface from end to end thereof irrespective of the length of the vegetable, and automatic actuated means for cutting off said engaged portions immediately upon the completion of the paring whereby a completely pared vegetable is obtained.

4. In a vegetable paring machine, means for holding a vegetable by engagement with the ends thereof and for turning said vegetable, paring means for the latter, and means for causing said paring means to follow the rounded ends of said vegetable and be maintained normal to the surface thereof irrespective of the length of said vegetable.

5. In a vegetable paring machine, means for holding a vegetable by engagement with the ends thereof and for turning said vegetable, paring means for said vegetable, and means for causing said paring means to follow the rounded ends of said vegetable and be maintained normal to the surface thereof, said means being automatically responsive whereby said paring means are guided in accordance with the contour of the vegetable irrespective of the length of the latter.

6. In a vegetable paring machine, means for holding a vegetable by engagement with the ends thereof and for turning said vegetable, paring means for said vegetable, and means for causing said paring means to follow the rounded ends of said vegetable, said means comprising a guiding member which is movable as dictated by the vegetable length whereby said paring means are guided in accordance with the contour of the vegetable, irrespective of the length of the latter.

7. In a vegetable paring machine, means for holding a vegetable by engagement with the ends thereof and for turning said vegetable comprising a two-part arbor, the parts of which are movable apart to accommodate vegetables of varying lengths, and means for causing said paring means to accurately follow the ends of said vegetable, said last means comprising a guide member which is attached to one part of said work arbor whereby the paring means are correctly guided, irrespective of the length of said vegetable.

8. In a vegetable paring machine, means for holding a vegetable by engagement with the ends thereof and for turning said vegetable comprising a two-part work arbor, the parts of which are movable apart to accommodate vegetables of varying lengths, and means for causing said paring means to accurately follow the ends of said vegetable, said last means comprising a guide member which is attached to one part of said work arbor whereby the paring means are correctly guided, irrespective of the length of said vegetable, and a stationary guide member effective to guide said paring means around the end of the vegetable upon the initiation of the paring.

9. In a vegetable paring machine, paring means maintained normal to the vegetable surface from end to end thereof, means for holding a vegetable during paring, and means controlled by the completion of paring of said vegetable for cutting off the engaged portions and for permitting said pared vegetable to drop from said machine.

10. In a vegetable paring machine, paring means, means for holding a vegetable during paring, means controlled by the completion of paring of said vegetable for cutting off the engaged portions and permitting said pared vegetable to drop from said machine, and means for ejecting the cut-off vegetable ends from said holding means.

11. In a vegetable paring machine, means comprising a work arbor, having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, and means for guiding said paring means at the ends of said vegetable to accurately follow the contour thereof at these points.

12. In a vegetable paring machine, means, comprising a work arbor having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, comprising a floatable cutter, an arm supporting said cutter, a floatable support for said arm, and guiding means for moving said arm about said support whereby the cutter may accurately follow the contour of the ends of said vegetable.

13. In a vegetable paring machine, means comprising a work arbor having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, comprising a floatable cutter, an arm supporting said cutter, a floatable support for said arm, and guiding means for moving said arm about said support whereby the cutter may accurately follow the contour of the ends of said vegetable, one of said guiding means being mounted on the movable part of said work arbor whereby said cutter follows the end contour of said vegetable, irrespective of the length thereof.

14. In a vegetable paring machine, means comprising a work arbor having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, comprising a floatable cutter, an arm supporting said cutter, a floatable support for said arm, guiding means for moving said arm about said support whereby the cutter may accurately follow the contour of the ends of said vegetable, one of said guiding means being mounted on the movable part of said work arbor whereby the said cutter follows the end contour of said vegetable irrespective of the length of said vegetable, and means comprising a pair of knives adapted to swing across said vegetable and sever the engaged portions from the body thereof after the latter is pared.

15. In a vegetable paring machine, means comprising a work arbor having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, comprising a floatable cutter, an arm supporting said cutter, a floatable support for said arm, guiding means for moving said arm about said support whereby the cutter may accurately follow the contour of the ends of said vegetable, one of said guiding means being mounted on the movable part of said work arbor whereby said cutter follows the end contour of said vegetables, irrespective of the length of said vegetable, means comprising a pair of knives adapted to swing across said vegetable and sever the engaged portions from the body thereof after the latter is pared, and means for controlling the movement of said knives in accordance with the length of said vegetable.

16. In a vegetable paring machine, means comprising a work arbor having one part thereof movable to accommodate vegetables of varying lengths, for holding and turning a vegetable, paring means adapted to be moved along, and in contact with, said vegetable while it is being turned, means for causing said paring means to follow the minor irregularities of said vegetable, comprising a floatable cutter, an arm supporting said cutter, a floatable support for said arm, guiding means for moving said arm about said support whereby the cutter may accurately follow the contour of the ends of said vegetable, one of said guiding means being mounted on the movable part of said work arbor whereby said cutter follows the end contour of said vegetable, irrespective of the length of said vegetable, means comprising a pair of knives adapted to swing across said vegetable and sever the engaged portions from the body thereof after the latter is pared, and means comprising an engaging member which travels with said cutter and operates said knives after the body of said vegetable is pared.

17. In a vegetable paring machine, an arbor for holding and turning a vegetable relative to a paring member, one part of said arbor being movable whereby vegetables of varying lengths may be held therein, driving means, a paring device, comprising a floatable cutter, a carriage for supporting said paring device, means for propelling said carriage from said driving means, means likewise actuated from said driving means for cutting off the engaged ends of said vegetable, means for disengaging said carriage from said driving means, and means for returning said carriage to its initial position upon said disengagement.

18. In a vegetable paring machine, an arbor for holding and turning a vegetable relative to a paring member, one part of said arbor being movable whereby vegetables of varying lengths may be held therein, driving means, a paring device comprising a floatable cutter, a carriage for supporting said paring device, means for connecting said work arbor to said driving means, means for connecting said carriage to said driving means whereby said cutter is progressed from end-to-end of said vegetable while the latter is being turned, and means operable upon the completion of the paring for disconnecting both said arbor and said carriage from said driving means.

19. In a vegetable paring machine, an arbor for holding and turning a vegetable relative to a paring member, one part of said arbor being movable whereby vegetables of varying lengths may be held therein, driving means, a paring device comprising a floatable cutter, a carriage for supporting said paring device, means for connecting said work arbor to said driving means, means for connecting said carriage to said driving means whereby said cutter is progressed from end-to-end of said vegetable while the latter is being turned, means operable upon the completion of the paring for disconnecting both said arbor and said carriage from said driving means, and means for again connecting said elements to the driving mechanism when it is desired to initiate the paring action.

20. In a paring machine, a frame, a two-part work arbor associated with said frame, one part being stationary and the other part being movable along supporting members on said frame whereby vegetables of varying lengths may be held between the part of said arbor, and said movable part being manually movable along supporting rods to grasp a vegetable, means for turning said arbor, a cutter, a carriage for the latter, rods for supporting said carriage, a worm mounted for rotation in said frame and adapted to engage said carriage whereby the latter may be moved when said worm is turned, driving means, and means for disengaging both said arbor from said driving means and said carriage from said worm.

21. In a paring machine, a frame, a two-part work arbor associated with said frame, one part being stationary and the other part being movable along supporting members on said frame whereby vegetables of varying lengths may be held between the part of said arbor, and said movable part being manually movable along supporting rods to grasp a vegetable, means for turning said arbor, a cutter, a carriage for the latter, rods for supporting said carriage, a worm mounted for rotation in said frame and adapted to engage said carriage whereby the latter may be moved when said worm is turned, driving means, means comprising a pivoted bar which is raised by the movable part of said arbor upon completion of paring, and means for again connecting said elements to said driving means to initiate a paring operation.

22. In a paring machine, a frame, a two-part work arbor associated with said frame, one part being stationary and the other part being movable along supporting members on said frame whereby vegetables of varying lengths may be held between the part of said arbor, and said movable part being manually movable along supporting rods to grasp a vegetable, means comprising a gearing system and a clutch for turning said arbor, a cutter, a carriage for the latter, rods for supporting said carriage, a worm mounted for rotation in said frame, means comprising a pin on said carriage for engaging said worm whereby said carriage is progressed as said arbor is turned, driving means for said worm, said means being capable of engagement by said clutch to turn said arbor, and means comprising a bar which is lifted by the movable arbor part to disengage said clutch and said pin whereby the movement of the several parts is stopped when the paring is completed.

23. In a paring machine, a frame, a two-part work arbor associated with said frame, one part being stationary and the other part being movable along supporting members on said frame whereby vegetables of varying lengths may be held between the part of said arbor, and said movable part being manually movable along supporting rods to grasp a vegetable, means for turning said arbor, a cutter, a carriage for the latter, rods for supporting said carriage, a worm mounted for rotation in said frame and adapted to engage said carriage whereby the latter may be moved when said worm is turned, driving means, knives mounted on one of said supporting rods and adapted to swing across said vegetable close to the points of engagement whereby the engaged portions are cut off, one of said knives being rigidly mounted on said rod while the other knife is adapted to slide therealong as dictated by the length of the vegetable being pared, and means for turning said knives when the paring operation is completed to cut off said ends, said means comprising an arm connected to said knives and engageable by said carriage whereby said knives are operated after said carriage has progressed said cutter the full length of said vegetable.

24. In a paring machine, a frame, a two-part work arbor associated with said frame, one part being stationary and the other part being movable along supporting members on said frame whereby vegetables of varying lengths may be held between the part of said arbor and said movable part being manually movable along supporting rods to grasp a vegetable, means for turning said arbor, a cutter, a carriage for the latter, said cutter being floatably mounted, whereby it may turn as required to accurately follow the outline of the vegetable being pared and especially the contour of the ends thereof, means for positively governing the position of said cutter comprising engageable members, and guides for engaging said members to turn said cutter at the ends of a vegetable, one of said guides being mounted on said frame to govern the cutter movement as the paring is initiated and the other guide being mounted on said movable arbor part whereby it is always in correct position to engage said members to properly turn said cutter to round the end of the vegetable as the paring is completed.

25. In a paring machine, a frame, a two-part work arbor associated with said frame, one part being stationary and the other part movable along supporting members on said frame whereby vegetables of varying lengths may be held between the part of said arbor, and said movable part being manually movable along supporting rods to grasp a vegetable, means for turning said arbor, a cutter, a carriage for the latter, said cutter being supported by an arm which swings about one axis on a yoke and said yoke being mounted to swing about an axis perpendicular to said first axis whereby it may be turned as required to accurately follow the outline of the vegetable being pared, and especially the contour of the ends thereof, means for positively governing the position of said cutter comprising engageable rollers, and guides for engaging said rollers to turn said yoke about said last named axis as dictated by the rounded ends of said vegetable, one of said guides being mounted on said frame to govern the cutter movement as the paring is initiated and the other guide being mounted on said movable arbor part whereby it is always in correct position to engage said rollers to properly turn said cutter to round the end of the vegetable as the paring is completed.

26. In a paring machine, a frame, a two-part work arbor associated with said frame, one part being stationary and the other part being movable along supporting members on said frame whereby vegetables of varying lengths may be held between the part of said arbor and said movable part being manually movable along supporting rods to grasp a vegetable, means for turning said arbor, a cutter, a carriage for the latter, said cutter comprising a knife movable about a pivot, a guard member cooperating with said knife and movable therewith, means for holding said knife and guard against the vegetable to be pared, an arm supporting said knife guard and mounted to swing about one axis whereby the knife may have a considerable vertical movement, a support about which said arm swings which is itself pivoted to swing about an axis perpendicular to said first axis whereby said arm may move in directions at right angles to one another, a carriage for progressing said knife longitudinally of the vegetable, engageable members fast to said support, and guides to move said members to cause said arm to closely follow the contour at the ends of the vegetable, said members being brought into engagement with said guides as said carriage is moved longitudinally of said vegetable, one of said guides being mounted on said frame and engaging said members to properly move said cutter as the paring is initiated and the other guide being mounted on the movable work arbor so that it always synchronizes with the last peeled end of the vegetable and moves said cutter to pare this portion.

27. In a vegetable paring machine, means for holding a vegetable, paring means for the latter, and means for causing said paring means to follow the rounded ends of said vegetable, said last named means comprising a member which is adjusted in accordance with the length of the vegetable to be pared.

28. In a vegetable paring machine, means for holding a vegetable, paring means for the latter, and means for causing said paring means to follow the rounded ends of said vegetable, said last named means comprising a member which is automatically adjusted in accordance with the length of the vegetable to be pared.

29. In a vegetable paring machine, means for holding a vegetable, paring means comprising a cutter element, and means for causing the cutter to accurately follow the rounded ends of said vegetable and be maintained substantially normal to the surface thereof irrespective of the length of said vegetable, said last named means comprising a member which is adjusted in accordance with the length of the vegetable.

30. In a vegetable paring machine, means for holding a vegetable and adjustable to accommodate varying lengths of vegetables, paring means, and means actuated by the adjustment of said holding means to cause said paring means to accurately follow the rounded ends of a vegetable. irrespective of the length thereof.

31. In a vegetable paring machine, means for holding a vegetable and adjustable to accommodate varying lengths of vegetables, paring means adapted to be moved to accurately follow the rounded ends of a vegetable, and guide means for said paring means associated with said holding means and adapted to be positioned by the adjustment of said holding means to cause said paring means to follow said ends irrespective of the length of the vegetable.

32. In a vegetable paring machine, a cutter comprising a knife and mounting means for said knife permitting at least three distinct movements of the same whereby it can accurately follow the contour of a vegetable irrespective of its length.

33. In a vegetable paring machine, a cutter comprising a knife and mounting means for said knife permitting movement of the same about an axis at all times parallel to the surface of the vegetable being pared irrespective of the length of said vegetable.

34. In a vegetable paring machine, a cutter comprising a knife capable of movement, an axis and about which said knife may be moved to be maintained at all times parallel to the surface of the vegetable being pared, and means for moving said axis to take care of the major irregularities in the vegetable surface irrespective of the length of said vegetable.

35. In a vegetable paring machine, a cutter comprising a knife and the paring portion thereof being arcuate in shape and means for continuously and automatically maintaining the center of said arcuate paring portion in contact with and normal to the vegetable surface irrespective of the length of the vegetable.

36. In a vegetable paring machine, a cutter comprising a knife of hook formation, the shank of said hook being attached to a support and the paring portion thereof being arcuate in shape, and means for positively swinging said knife as the rounded ends of a vegetable are pared, said means being automatically responsive as the knife approaches said round ends so that the cutter of said arcuate portion is, at all times, effective to properly pare said vegetable, the center of said arcuate paring portion being always in contact with the vegetable surface.

37. In a vegetable paring machine, a cutter comprising a knife of hook formation, the shank of said hook being attached to a support and the paring portion thereof being arcuate in shape, and guiding means responsive to the vegetable length for insuring the parallel relation of the center of said arcuate knife to the straight sides of said vegetable as the knife is bodily progressed along said vegetable.

38. In a vegetable paring machine, a cutter comprising a knife capable of at least three distinct movements whereby it can accurately follow the contour of a vegetable, and guiding means responsive to the vegetable length for allowing two only of said movements while the central portion of said vegetable is being pared.

39. In a vegetable paring machine, a cutter comprising a knife capable of at least three distinct movements whereby it can accurately follow the contour of a vegetable, means for allowing two only of said movements while the central portion of said vegetable is being pared, and means for insuring all three said movements at the rounded ends of said vegetable, irrespective of the length of the vegetable.

In witness whereof, I have hereunto subscribed my name.

BERNARD P. KOOLS.